US008218286B2

(12) United States Patent
Wu et al.

(10) Patent No.: US 8,218,286 B2
(45) Date of Patent: Jul. 10, 2012

(54) MEMS MICROPHONE WITH SINGLE POLYSILICON FILM

(75) Inventors: Ting-Hau Wu, Yilan (TW); Chun-Ren Cheng, Hsin-Chu (TW); Jiou-Kang Lee, Zhu-Bei (TW); Shang-Ying Tsai, Jhongli (TW); Jung-Huei Peng, Jhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 631 days.

(21) Appl. No.: 12/347,046

(22) Filed: Dec. 31, 2008

(65) Prior Publication Data

US 2010/0117168 A1 May 13, 2010

Related U.S. Application Data

(60) Provisional application No. 61/113,831, filed on Nov. 12, 2008.

(51) Int. Cl.

*H01G 4/228* (2006.01)
*H04R 25/00* (2006.01)
*H04R 19/00* (2006.01)

(52) U.S. Cl. ...................... 361/306.2; 381/191; 367/181

(58) Field of Classification Search .................. 361/280, 361/278, 296, 277, 306.2; 381/191; 367/181
See application file for complete search history.

(56) References Cited

U.S. PATENT DOCUMENTS

| | | | | |
|---|---|---|---|---|
| 5,650,881 | A | 7/1997 | Hornbeck | |
| 6,568,794 | B2 | 5/2003 | Yamanaka et al. | |
| 6,847,090 | B2 | 1/2005 | Loeppert | |
| 7,167,298 | B2 | 1/2007 | Pan | |
| 7,307,497 | B2 * | 12/2007 | Joodaki | 333/238 |
| 7,307,777 | B2 | 12/2007 | Pan | |
| 7,346,178 | B2 | 3/2008 | Zhe et al. | |
| 7,466,834 | B2 * | 12/2008 | Ogura et al. | 381/174 |
| 7,804,969 | B2 * | 9/2010 | Wang et al. | 381/174 |
| 2010/0084721 | A1 * | 4/2010 | Wu et al. | 257/415 |

* cited by examiner

*Primary Examiner* — Eric Thomas
*Assistant Examiner* — Arun Ramaswamy
(74) *Attorney, Agent, or Firm* — Slater & Matsil, L.L.P.

(57) ABSTRACT

An integrated circuit structure includes a capacitor, which further includes a first capacitor plate formed of polysilicon, and a second capacitor plate substantially encircling the first capacitor plate. The first capacitor plate has a portion configured to vibrate in response to an acoustic wave. The second capacitor plate is fixed and has slanted edges facing the first capacitor plate.

20 Claims, 6 Drawing Sheets

MEMS MICROPHONE WITH SINGLE POLYSILICON FILM

This application claims the benefit of U.S. Provisional Patent Application Ser. No. 61/113,831, filed on Nov. 12, 2008, and entitled "Single Poly Structure MEMS Microphone," which application is incorporated herein by reference.

TECHNICAL FIELD

This invention relates generally to integrated circuit structures and manufacturing processes, and more particularly to micro-electro-mechanical system (MEMS) microphones, and even more particularly to MEMS microphones with single membranes.

BACKGROUND

Silicon-based micro-electro-mechanical system (MEMS) microphones, also known as acoustic transducers, have been studied for more than 20 years. Because of their potential advantages in miniaturization, performance, reliability, environmental endurance, low cost, and mass production capability, the MEMS microphones are gaining ground over conventional microphones. Of all the silicon-based approaches, capacitive microphones are the most popular.

FIG. 1 illustrates a conventional MEMS microphone 2. Two polysilicon films (membranes) 4 and 6 are parallel to, and close to, each other. The illustrated openings in films 4 and 6 are small holes. Polysilicon film 4 is fixed by the structure, and hence is substantially unmovable. Polysilicon film 6 includes a center portion that can vibrate, and fixed end portions. In response to acoustic wave, polysilicon film 6 vibrates, and hence its distance from polysilicon film 4 also changes. As a result, the capacitance of the capacitor that has polysilicon films 4 and 6 as two capacitor plates also fluctuates in response to the acoustic wave. Such fluctuation in capacitance is picked up by electrode 8, which is connected to polysilicon film 6, and another electrode (not shown) that is connected to polysilicon film 4.

MEMS microphone 2 suffers from drawbacks. First, since there are two polysilicon films, the respective manufacturing cost and cycle time are relatively high. Second, since polysilicon films 4 and 6 are closely located to each other, if vapor causes the sticking of polysilicon film 4 to polysilicon film 6, capacitor 2 will not be able to function properly, and the electrical signal generated from the acoustic wave will be distorted. New MEMS microphones with reduced manufacturing cost and improved reliability are thus needed.

SUMMARY OF THE INVENTION

In accordance with one embodiment of the present invention, an integrated circuit structure includes a capacitor, which further includes a first capacitor plate formed of polysilicon, and a second capacitor plate substantially encircling the first capacitor plate. The first capacitor plate has a portion configured to vibrate in response to an acoustic wave. The second capacitor plate is fixed and has slanted edges facing the first capacitor plate.

In accordance with another embodiment of the present invention, an integrated circuit structure includes a silicon substrate; and a first opening extending from a top surface to a bottom surface of the silicon substrate. A polysilicon region is over the silicon substrate. A second opening is in the polysilicon region, wherein the first opening and the second opening are substantially vertically overlapped to form a continuous opening. A polysilicon membrane is in the second opening and electrically disconnected from the polysilicon region, wherein the polysilicon membrane has a top surface substantially level with a top surface of the polysilicon region. A first metallic electrode adjoins the polysilicon region. A second metallic electrode adjoins the polysilicon membrane.

In accordance with yet another embodiment of the present invention, an integrated circuit structure includes a silicon substrate; a dielectric layer over and contacting the silicon substrate; and a polysilicon region over the dielectric layer. An opening extends from a bottom surface of the silicon substrate to an intermediate level between a top surface and a bottom surface of the polysilicon region. A polysilicon membrane has a bottom surface facing the opening, and a top surface level with the top surface of the polysilicon region, wherein the polysilicon membrane is encircled by, and electrically disconnected from, the polysilicon region. The integrated circuit structure further includes a first metallic electrode over and adjoining the polysilicon region and a second metallic electrode over and adjoining the polysilicon membrane.

In accordance with yet another embodiment of the present invention, a method of forming an integrated structure includes forming a dielectric layer over and contacting a silicon substrate; forming a polysilicon region over the dielectric layer; and forming a polysilicon membrane having a top surface level with the top surface of the polysilicon region. The polysilicon membrane is encircled by, and electrically disconnected from, the polysilicon region. An opening is formed to extend from a bottom surface of the silicon substrate to the polysilicon membrane. The method further includes forming a first metallic electrode over and adjoining the polysilicon region; and forming a second metallic electrode over and adjoining the polysilicon membrane.

In accordance with yet another embodiment of the present invention, a method of forming an integrated structure includes providing a silicon substrate; and forming a dielectric layer over and contacting the silicon substrate. The dielectric layer has an inner portion and an outer portion encircling the inner portion. The method further includes thinning the outer portion without thinning the inner portion of the dielectric layer, wherein a remaining lower layer of the outer portion forms a dielectric region. A polysilicon layer is formed over the inner portion of the dielectric layer and the dielectric region, followed by a chemical mechanical polish to level a top surface of the polysilicon layer to form a polysilicon membrane directly over the inner portion of the dielectric layer, and a polysilicon region directly over the dielectric region. The polysilicon membrane is patterned to separate the polysilicon membrane from the polysilicon region. The method further includes forming a first metal electrode over and contacting the polysilicon membrane and a second metal electrode over and contacting the polysilicon region; forming an opening extending from a bottom surface the silicon substrate to expose the dielectric layer; and removing the inner portion of the dielectric layer.

The advantageous features of the present invention include reduced manufacturing cost, reduced manufacturing cycle time, and improved reliability.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the present invention are discussed in detail below. It should be appreciated, however, that the embodiments of the present invention provide many applicable inventive concepts that can be embodied in a wide variety of specific contexts. The specific embodiments discussed are merely illustrative of specific ways to make and use the invention, and do not limit the scope of the invention.

A novel micro-electro-mechanical system (MEMS) microphone embodiment and the method of forming the same are presented. The intermediate stages of manufacturing the embodiment of the present invention are illustrated. The variations and operation of the embodiment are discussed. Throughout the various views and illustrative embodiments of the present invention, like reference numbers are used to designate like elements.

Figure 1:
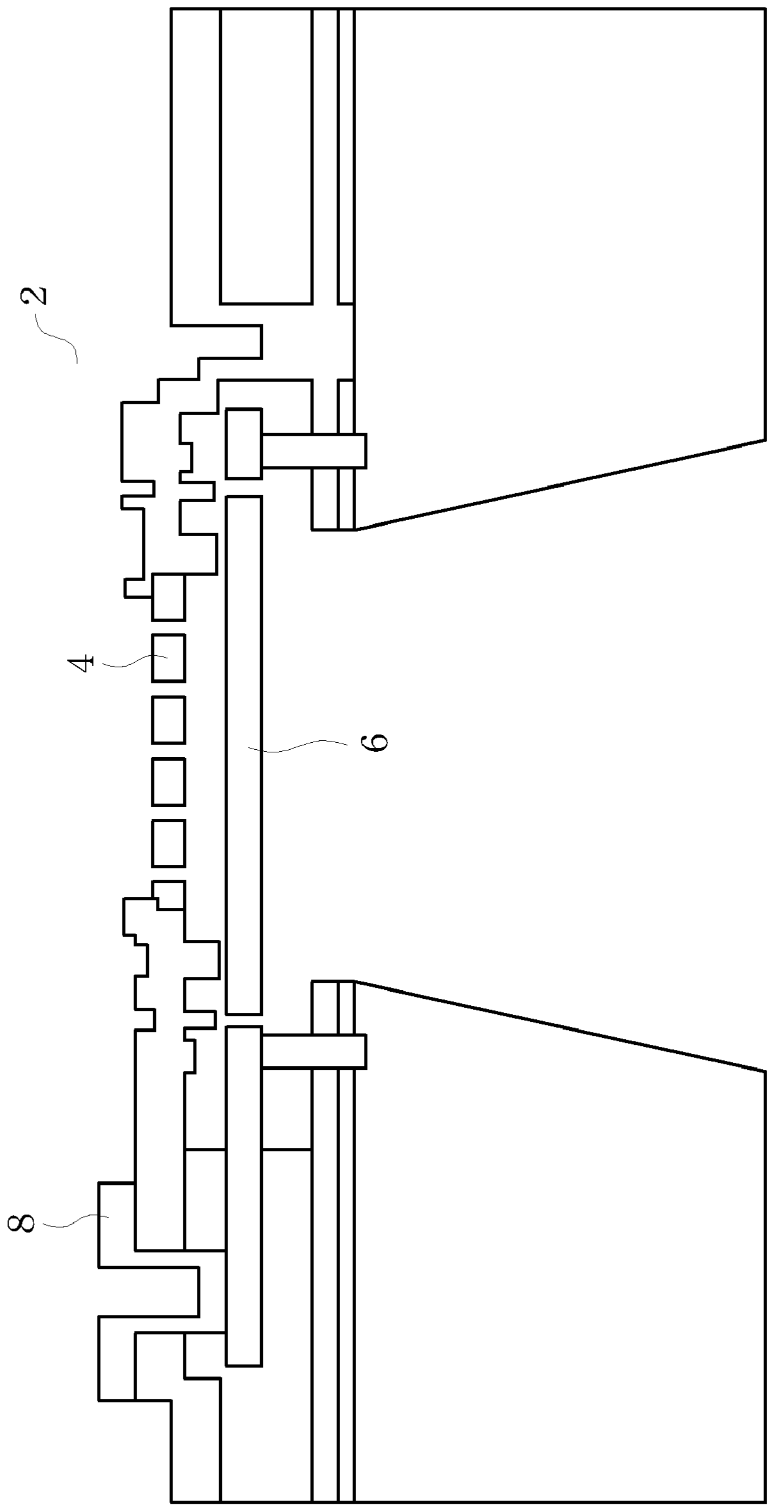
Fig. 1 (Prior Art)
FIG. 1 illustrates a conventional micro-electro-mechanical system (MEMS) microphone comprising two polysilicon films that form a capacitor.
Figure 2:
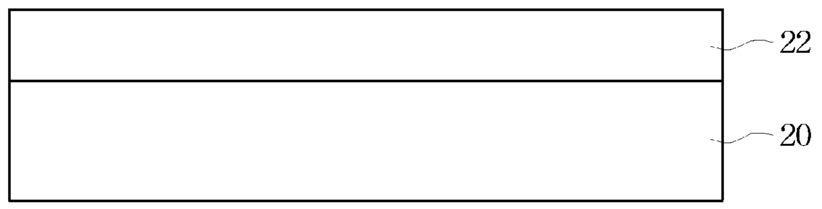
FIGS. 2 through 10B are cross-sectional views of intermediate stages in the manufacturing of a MEMS microphone embodiment of the present invention.

Referring to FIG. 2, substrate 20 is provided. In an embodiment, substrate 20 is a bulk silicon substrate. In alternative embodiments, substrate 20 may be formed of other commonly used semiconductor materials including group III, group IV, and/or group V materials. In yet other embodiments, substrate is a dielectric substrate.

Dielectric layer 22 is formed on substrate 20, and may be formed using chemical vapor deposition (CVD) methods such as plasma enhanced chemical vapor deposition (PECVD), thermal oxidation of silicon, or the like. In an embodiment, dielectric layer 22 comprises silicon oxide, although it may also be formed of other types of dielectric materials such as silicon nitride, silicon carbide, or the like. The thickness of dielectric layer 22 may be greater than about 4 μm, although the thickness may also be less than about 4 μm. It is realized, however, that the dimensions recited throughout the description are merely examples, and may be changed if different formation technologies are used.

Figure 3:
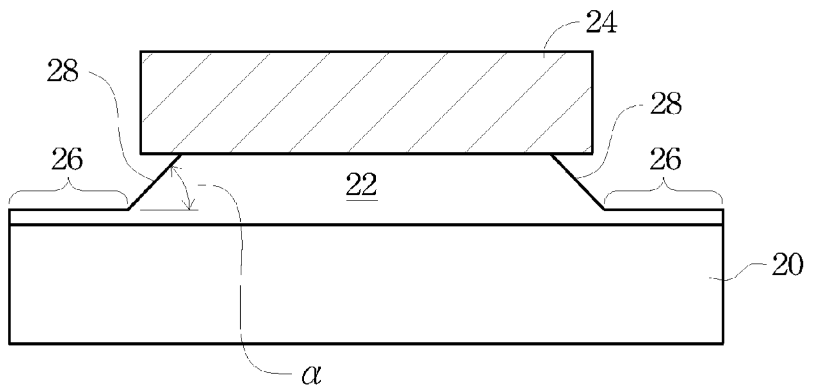

FIG. 3 illustrates the thinning of dielectric layer 22. Mask 24, which may be a photo resist or a hard mask formed of, for example, silicon nitride, is formed and patterned. The top view of mask 24 is preferably circular (please refer to the shape of membrane 30 in FIG. 11), although it may also have other shapes such as square, or other type of polygons. The portion of dielectric layer 22 covered by mask 24 is also referred to as an inner portion, while the uncovered portion of dielectric layer 22, which encircles the inner portion, is referred to as an outer portion. A wet etching is performed to thin the outer portion of dielectric layer 22. In the resulting structure, a thin layer of the outer portion (referred to as thin dielectric region 26) preferable remains after the thinning, and covers substrate 20. In alternative embodiments, the outer portion of dielectric layer 22 is fully removed, and the underlying portion of substrate 20 is exposed. The thickness of thin dielectric region 26 may be less than about 0.5 μm, for example, between about 2000 Å and about 3000 Å.

Edges 28 that connect the top surface of the remaining portion of dielectric layer 22 to the top surface of thin dielectric region 26 are slanted. Slant angle α may be less than about 80 degrees, or even between about 45 degrees and about 65 degrees. In an exemplary embodiment, slant angle α is about 53 degrees with about one degree variation (or about 52 degrees to about 54 degrees). After the etching of dielectric layer 22, mask 24 is removed.

Figure 4:
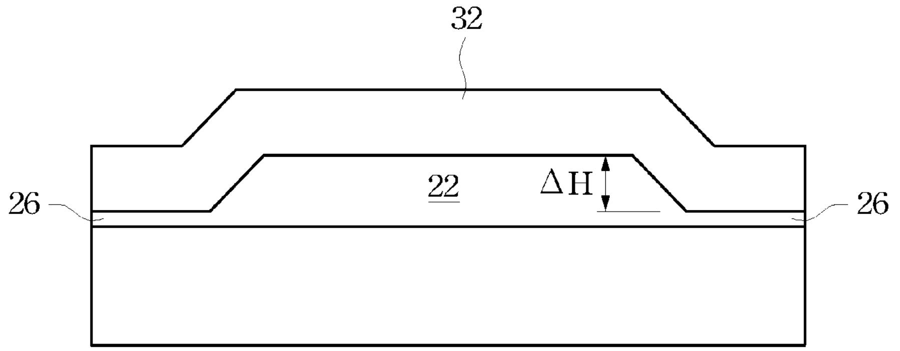

Next, as shown in FIG. 4, polysilicon layer 32 is deposited. The thickness of polysilicon layer 32 is preferably greater than the thickness difference ΔH, which is the difference between the thickness of dielectric layer 22 and the thickness of thin dielectric region 26. When the deposition process of polysilicon layer 32 proceeds, a p-type or an n-type impurity, such as phosphorous, may be in-situ doped to increase the conductivity of polysilicon layer 32. In alternative embodiments, other impurities such as arsenic may also be used. Although boron may also be used, due to the relatively great diffusion distance of boron, phosphorous is more desirable than boron.

Figure 5:
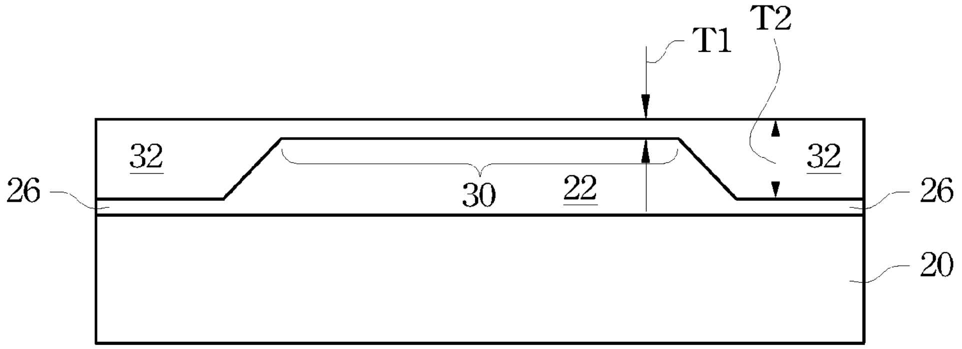

Next, as shown in FIG. 5, a chemical mechanical polish (CMP) is performed to remove excess polysilicon layer 32 and to flatten the top surface of polysilicon layer 32. In the region directly over dielectric layer 22, polysilicon layer 32 is thinned to a thickness T1 appropriate for being used as the membrane 30 of a microphone, for example, between about 1.7 μm and about 2 μm. The thickness T1 of membrane 30 may be less than about 33 percent, and more preferably less than about 25 percent of the thickness T2 of polysilicon layer 32. In alternative embodiments, the portion of polysilicon layer 32 directly over the dielectric layer 22 may be thinned using etching, wherein the portion of polysilicon layer 32 directly over thin dielectric region 26 may be protected by a mask, and not etched during the thinning process.

Figure 6:
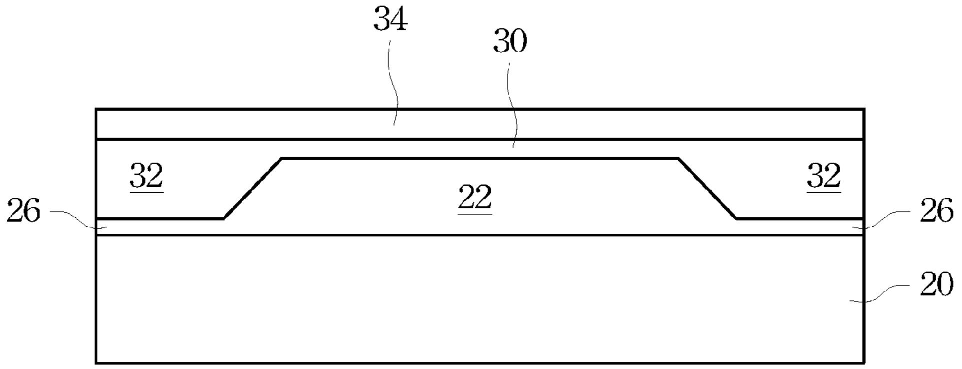
Figure 7:
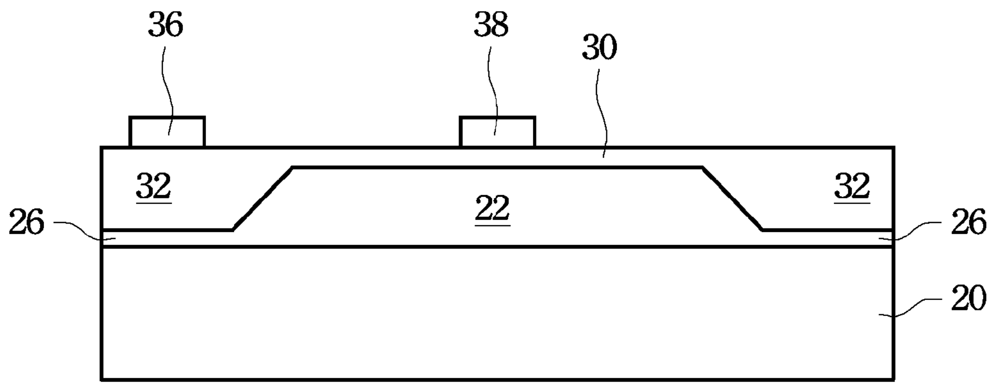
Figure 11:
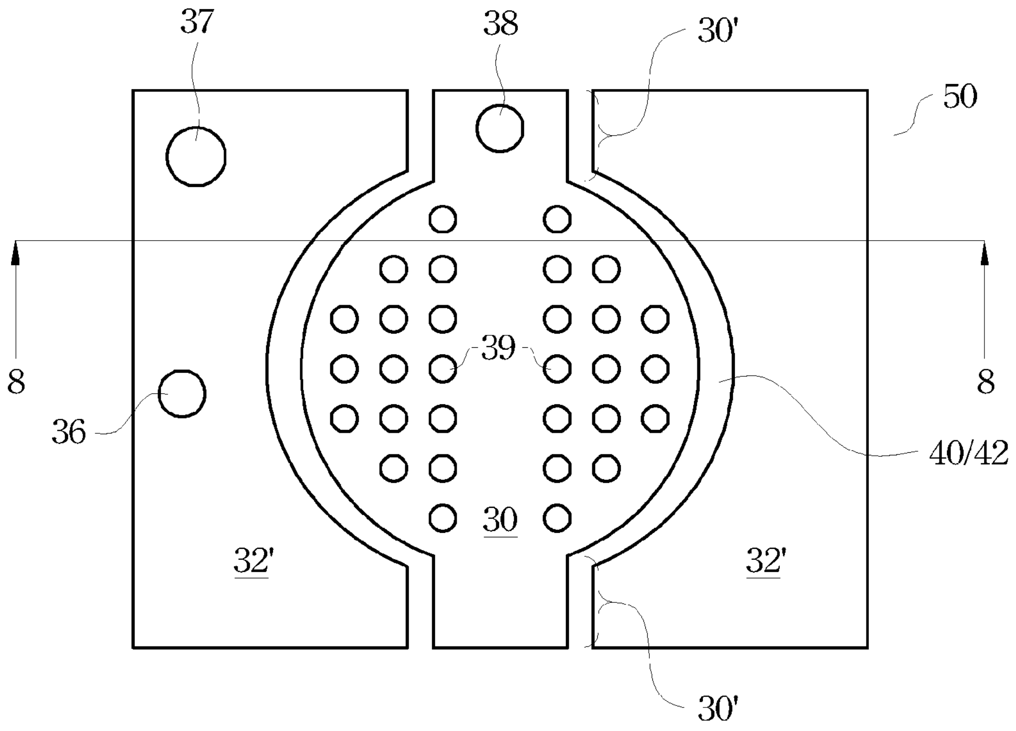
FIG. 11 illustrates a top view of the MEMS microphone embodiment as shown in FIG. 10A.

Referring to FIG. 6, metal layer 34 is formed, which may include metals such as copper, aluminum, gold, and/or the like. In FIG. 7, metal layer 34 is patterned to form electrodes including electrodes 36 and 38. A top view of the exemplary electrodes is shown in FIG. 11, which illustrates electrode 36, electrodes 38, and an additional electrode 37 that are formed by the process shown in FIGS. 6 and 7.

Figure 8:
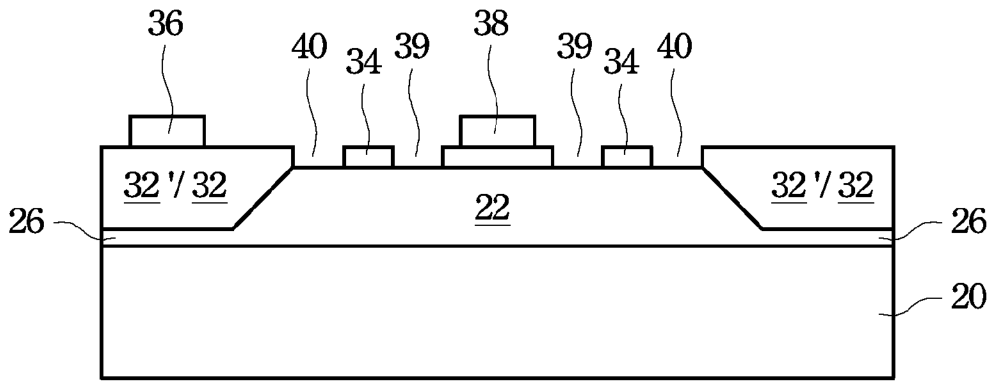

FIG. 8 illustrates the patterning of polysilicon membrane 30 to form a plurality of holes 39 in polysilicon membrane 30. FIG. 11 illustrates a top view of the structure shown in FIG. 8, wherein the cross-sectional shown in FIG. 8 is obtained in a plane crossing line 8-8 in FIG. 11. Please note that electrodes 36 and 38 are also shown in FIG. 8, although they may not be in the same plane as holes 32. Further, as also illustrated in FIG. 11, opening 40 is formed close to the edge portion of membrane 30, so that membrane 30 is separated from the remaining part of polysilicon layer 32. Throughout the description, the remaining portion of polysilicon layer 32 that encircles membrane 30 is referred to as thick polysilicon region 32'. Please note that polysilicon membrane 30 is attached to thick polysilicon portion 30', which are used to secure poly membrane 30 even after dielectric layer 22 is removed.

Figure 9:
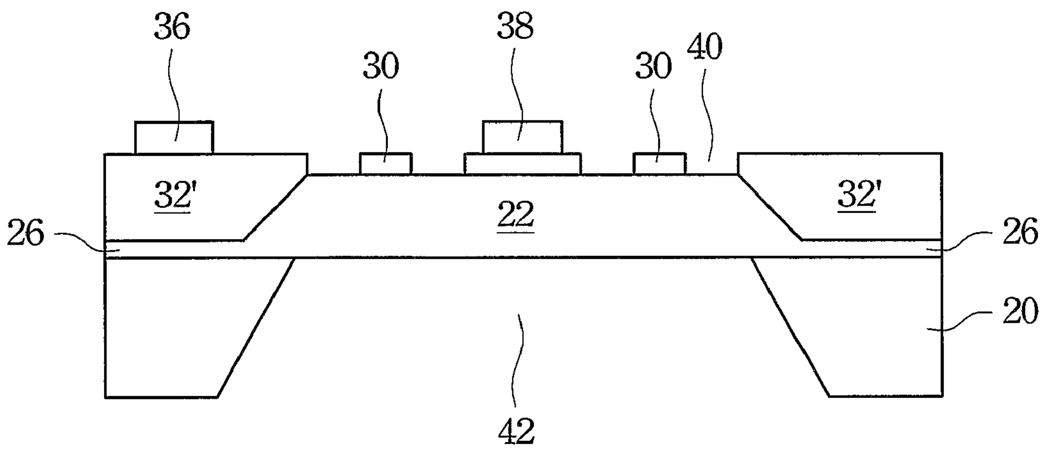

Next, as shown in FIG. 9, substrate 20 is etched from its backside, forming opening 42, through which the inner portion of dielectric layer 22 is exposed. Preferably, opening 42 is small enough so that thin dielectric region 26 is not exposed. On the other hand, opening 42 is preferably larger than membrane 30, so that when membrane 30 vibrates in response to an acoustic wave, membrane 30 has enough room to move down without touching substrate 20. Accordingly, in an embodiment, in the bottom view of the structure, opening 42 may also have a circular shape. In an embodiment, opening 42 is formed using deep reactive ionic etching (DRIE). The sidewall of opening 42 may be slanted, or substantially straight.

Figure 10A:
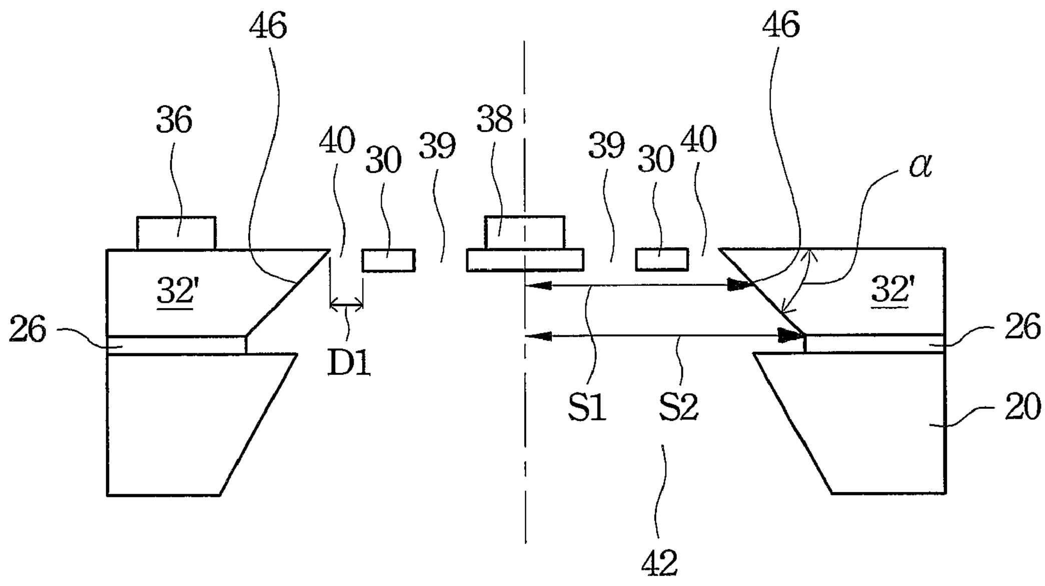

Referring to FIG. 10A, dielectric layer 22 is etched, for example, using wet etching. The center portion (the circular portion) of membrane 30 is thus released from dielectric layer 22. The transition portion of dielectric region connecting thin dielectric region 26 and inner dielectric region 22 is also etched. As a result, the slant edges (sidewalls) 46 of thick polysilicon region 32', which slant edges 46 contact slant edges 28 of dielectric layer 22 (refer to FIG. 3), are exposed. Slant angle α and the profile of dielectric layer 22 is thus transferred to the sidewalls 46 of thick polysilicon region 32'. It is preferred, however, that thin dielectric regions 26 remains, which not only join thick polysilicon region 32' and substrate 20 together, but also electrically insulate thick polysilicon region 32' from substrate 20. It is noted that an upper portion of the slanted sidewalls 46 has distance 51 from a center axis of opening 42, and a lower portion of the slant edges 46 has distance S2 from the center axis, with distance S2 being greater than distance S1.

FIG. 11 illustrates a top view of the structure shown in FIG. 10A. It is noted that membrane 30 is physically, and electrically, separated from thick polysilicon region 32', with only the end portions 30' of membrane 30 being fixed, while the center portion of membrane is free to vibrate. Capacitor 50 is thus formed. Membrane 30 acts as a first capacitor plate of capacitor 50. Electrode 34 acts as the electrode picking up the signal on membrane 30. Thick polysilicon region 32' acts as a second capacitor plate of capacitor 50. Electrode 36 acts as the electrode picking up the signal on thick polysilicon region 32'. An additional electrode 37 may be formed simultaneously as the formation of electrodes 34 and 36, and used for grounding.

Figure 10B:
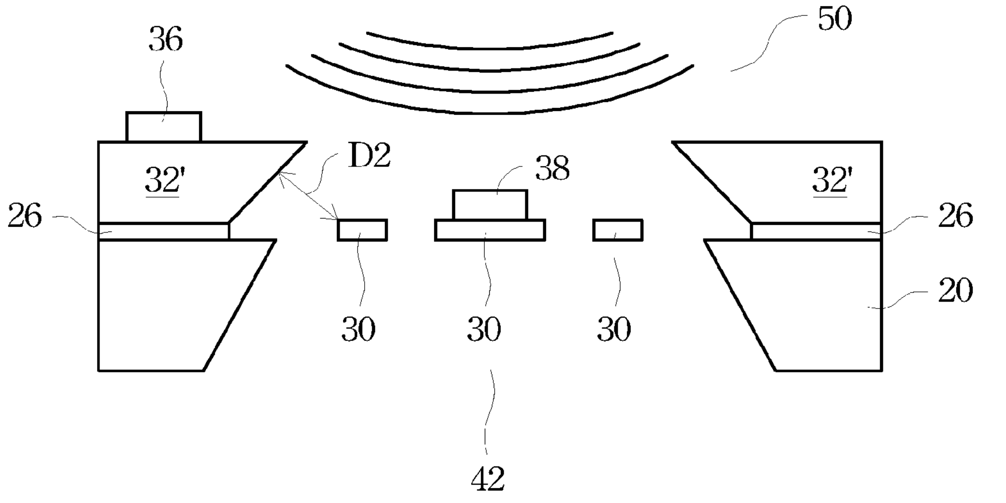

The operation of capacitor 50 may be explained as follows. When no acoustic wave is received by membrane 30, membrane 30 is at is original position, as is shown in FIG. 10A. The distance between membrane 30 and thick polysilicon region 32' is illustrated as D1. If an acoustic wave is received by membrane 30, membrane 30 vibrates, and may move to a new position as shown in FIG. 10B. Opening 42 is an air-gap, thus allows the movement of membrane 30. In addition, openings 39 are also air-gaps. The distance between membrane 30 and thick polysilicon region 32' changes to D2. As is known in the art, the capacitance of a capacitor is determined by the distance between the capacitor plates. Accordingly, the acoustic wave causes a change in the capacitance of capacitor 50, which capacitance change may be detected through electrodes 36 and 38 in the form of an electrical signal change. Capacitor 50 thus has the function of converting an acoustic signal to an electrical signal, and hence acts as a microphone. To increase the range of the capacitance variation, distance D1 as shown in FIG. 10A is preferably less than about 1 μm, although a greater distance may also be used.

The embodiments of the present invention have several advantageous features. The microphone embodiment of the present invention has only one polysilicon membrane, and no other membrane directly overlying or underlying the single membrane is formed. The microphone embodiments of the present invention are hence not prone to the problem existed in dual-polysilicon-film microphones, which problem is caused by the sticking of two films with the existence of vapor. Further, because only one membrane needs to be formed, the manufacturing process is simplified. The manufacturing cost and cycle time are thus reduced.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. In addition, each claim constitutes a separate embodiment, and the combination of various claims and embodiments are within the scope of the invention.

What is claimed is:

1. An integrated circuit structure comprising:

a capacitor comprising:

a first capacitor plate formed of polysilicon, wherein the first capacitor plate comprises a portion configured to vibrate in response to an acoustic wave; and a second capacitor plate substantially encircling the first capacitor plate, wherein the second capacitor plate is fixed and comprises slanted edges facing the first capacitor plate, and wherein the slanted edges are edges of a conductive material.

2. The integrated circuit structure of claim 1, wherein the integrated circuit structure does not comprise any conductive plate parallel to, and directly overlying or underlying the first capacitor plate, and wherein the conductive plate is connected to an electrode.

3. The integrated circuit structure of claim 1 further comprising a substrate parallel to, and underlying, the second capacitor plate, wherein the substrate comprises an opening substantially vertically aligned to the first capacitor plate.

4. The integrated circuit structure of claim 3, wherein the opening has a greater area than the portion of the first capacitor plate.

5. The integrated circuit structure of claim 3, wherein the substrate is a silicon substrate.

6. The integrated circuit structure of claim 3, wherein the second capacitor plate comprises an opening, wherein the first capacitor plate is in the opening, and wherein the opening has a greater dimension on a side closer to the substrate, and a smaller dimension on a side farther away from the substrate.

7. The integrated circuit structure of claim 3 further comprising a dielectric layer spacing the second capacitor plate apart from the substrate, wherein the dielectric layer adjoins the second capacitor plate and the substrate.

8. The integrated circuit structure of claim 1, wherein the slanted edges are substantially straight in cross-sectional views made in planes perpendicular to in-plane directions of the first capacitor plate.

9. The integrated circuit structure of claim 1, wherein the second capacitor plate comprises doped polysilicon, and wherein the first capacitor plate and the second capacitor plate are doped with a same impurity, and have a same impurity concentration.

10. An integrated circuit structure comprising:

a silicon substrate;

a first opening extending from a top surface to a bottom surface of the silicon substrate;

a polysilicon region over the silicon substrate;

a second opening in the polysilicon region, wherein the first opening and the second opening are substantially vertically overlapped to form a continuous air-gap;

a first metallic electrode adjoining the polysilicon region;

a polysilicon membrane in the second opening and electrically disconnected from the polysilicon region, wherein the polysilicon membrane has a top surface substantially level with a top surface of the polysilicon region; and a second metallic electrode adjoining the polysilicon membrane.

11. The integrated circuit structure of claim 10, wherein a sidewall of the polysilicon region facing the second opening is slanted, and wherein a top dimension of the second opening is smaller than a respective bottom dimension of the second opening.

12. The integrated circuit structure of claim 11, wherein the sidewall has a slant angle of between about 45 degrees and about 65 degrees.

13. The integrated circuit structure of claim 10, wherein the polysilicon membrane and the polysilicon region comprise substantially a same impurity with substantially a same doping concentration.

14. The integrated circuit structure of claim 10 further comprising a dielectric layer between and adjoining the polysilicon region and the silicon substrate, wherein the dielectric layer comprises a third opening being a portion of the continuous opening.

15. An integrated circuit structure comprising:

a silicon substrate;

a dielectric layer over and contacting the silicon substrate;

a polysilicon region over the dielectric layer;

an air-gap extending from a bottom surface of the silicon substrate to an intermediate level between a top surface and a bottom surface of the polysilicon region, wherein the polysilicon region has inner sidewalls inside and facing the air-gap, and wherein upper portions of the inner sidewalls are closer to a center axis of the air-gap than lower portions of the inner sidewalls;

a first metallic electrode over and adjoining the polysilicon region;

a polysilicon membrane having a bottom surface facing the air-gap, and a top surface level with the top surface of the polysilicon region, wherein the polysilicon membrane is electrically disconnected from the polysilicon region; and a second metallic electrode over and adjoining the polysilicon membrane.

16. The integrated circuit structure of claim 15, wherein the inner sidewalls have a slant angle of between about 52 degrees and about 54 degrees.

17. The integrated circuit structure of claim 15, wherein the polysilicon membrane comprises a plurality of through-openings, and wherein the through-openings are air-gaps.

18. The integrated circuit structure of claim 15, wherein the polysilicon membrane and the polysilicon region comprise a same impurity, and have a same doping concentration.

19. The integrated circuit structure of claim 10, wherein the polysilicon membrane is configured to be moveable in the air-gap.

20. The integrated circuit structure of claim 15, wherein the polysilicon membrane is configured to be moveable in the air-gap.

* * * * *